US009294991B2

(12) United States Patent
Chen

(10) Patent No.: US 9,294,991 B2
(45) Date of Patent: Mar. 22, 2016

(54) SYSTEMS AND METHODS FOR UTILIZING WIRELESS COMMUNICATIONS TO SUGGEST CONNECTIONS FOR A USER

(71) Applicant: Facebook, Inc., Menlo Park, CA (US)

(72) Inventor: Ben Chen, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/328,605

(22) Filed: Jul. 10, 2014

(65) Prior Publication Data

US 2016/0014677 A1   Jan. 14, 2016

(51) Int. Cl.
| | | |
|---|---|---|
| *H04M 3/42* | (2006.01) | |
| *H04W 48/16* | (2009.01) | |
| *H04W 48/10* | (2009.01) | |
| *H04W 4/02* | (2009.01) | |
| *H04W 4/06* | (2009.01) | |
| *H04W 4/00* | (2009.01) | |
| *H04W 4/20* | (2009.01) | |

(52) U.S. Cl.
CPC ............. *H04W 48/16* (2013.01); *H04W 48/10* (2013.01); *H04W 4/001* (2013.01); *H04W 4/021* (2013.01); *H04W 4/06* (2013.01); *H04W 4/206* (2013.01)

(58) Field of Classification Search
CPC ....... H04W 4/001; H04W 4/02; H04W 4/021; H04W 4/023; H04W 4/025; H04W 4/04; H04W 4/06; H04W 4/005; H04W 4/206; H04W 48/10; H04W 48/16
USPC ............ 455/414.1, 414.2, 416, 457, 458, 459
See application file for complete search history.

(56) References Cited

U.S. PATENT DOCUMENTS

| | | | |
|---|---|---|---|
| 8,886,836 B2* | 11/2014 | Luu ............................... 709/246 |
| 8,959,211 B2* | 2/2015 | Lessin ........................... 709/224 |
| 2007/0282621 A1* | 12/2007 | Altman et al. .................... 705/1 |
| 2011/0009102 A1* | 1/2011 | Almodovar Herraiz et al. ............................ 455/414.2 |
| 2012/0271908 A1* | 10/2012 | Luna et al. ..................... 709/216 |
| 2014/0129942 A1* | 5/2014 | Rathod .......................... 715/720 |
| 2014/0172980 A1* | 6/2014 | Russell .......................... 709/204 |
| 2015/0081449 A1* | 3/2015 | Ge et al. ...................... 705/14.66 |

* cited by examiner

*Primary Examiner* — Jean Gelin
(74) *Attorney, Agent, or Firm* — Sheppard Mullin Richter & Hampton LLP

(57) ABSTRACT

Systems, methods, and non-transitory computer-readable media can broadcast a first wireless communication including information associated with a first user. A second wireless communication including information associated with a second user can be detected. Log data including at least a portion of the information associated with the second user can be generated. The log data can also include signal strength data associated with the second wireless communication and time data indicating when the second wireless communication was detected. The log data can be provided for analysis. One or more connections suggested for the first user based, at least in part, on the log data can be received.

18 Claims, 11 Drawing Sheets

SYSTEMS AND METHODS FOR UTILIZING WIRELESS COMMUNICATIONS TO SUGGEST CONNECTIONS FOR A USER

FIELD OF THE INVENTION

The present technology relates to the field of suggesting connections. More particularly, the present technology provides techniques for utilizing wireless communications to suggest connections for a user.

BACKGROUND

Today, people often utilize computing devices or systems to access, engage with, or otherwise interact with social networking services. Frequently, users of a social networking service can form connections with one another within the social networking service. For example, a user can use his or her laptop computer to search for and find a childhood friend via the social networking service. The user can connect with his or her childhood friend, such as by adding the childhood friend as a "Friend" (or connection, contact, etc.) within the social networking service. In another example, the user can become acquainted with another user at a meeting or gathering. The user can access the social networking service with his or her smartphone in order to search for and connect with the other user.

However, under conventional approaches, a first user who desires to connect with a second user usually knows the second user's name, contact information, or has at least some level of mutual connection with the second user (e.g., the first user can have mutual friends or connections with the second user). If, for example, the first user meets the second user but forgets to obtain the second user's contact information and does not apparently share any mutual connections with the second user, it can be challenging or inefficient for the first user to search for and find the second user within the social networking service. These and other similar concerns can reduce the overall user experience associated with using social networking services.

SUMMARY

Various embodiments of the present disclosure can include systems, methods, and non-transitory computer readable media configured to broadcast a first wireless communication including information associated with a first user. A second wireless communication including information associated with a second user can be detected. Log data including at least a portion of the information associated with the second user can be generated. The log data can also include signal strength data associated with the second wireless communication and time data indicating when the second wireless communication was detected. The log data can be provided for analysis. One or more connections suggested for the first user based, at least in part, on the log data can be received.

In one embodiment, the one or more connections suggested for the first user can be presented. An instruction from the first user to connect with at least some of the one or more connections can be received.

In one embodiment, each of the first wireless communication and the second wireless communication can correspond to at least one of a Bluetooth Low Energy (BLE) communication, a ZigBee communication, a Z-Wave communication, a radio-frequency identification (RFID) communication, a near-field communication (NFC), or a personal area network (PAN) communication.

In one embodiment, the information associated with the first user can include a first identifier of the first user within a social networking service. The information associated with the second user can include a second identifier of the second user within the social networking service.

In one embodiment, the information associated with the first user can include a first web address. The information associated with the second user can include a second web address.

In one embodiment, the log data can be analyzed to determine whether the second user is to be included as a connection in the one or more connections suggested for the first user.

In one embodiment, the second user can be ranked, based on a plurality of factors, to determine whether the second user is to be included in the one or more connections suggested for the first user. The plurality of factors can include at least one of an inferred locational proximity between the first user and the second user, a frequency of inferred meetings between the first user and the second user, a duration of each of the inferred meetings between the first user and the second user, or a pattern of occurrences of inferred meetings between the first user and the second user.

In one embodiment, the inferred locational proximity can be determined based on the signal strength data associated with the second wireless communication.

In one embodiment, the frequency can be determined based on a number of instances in which the inferred locational proximity indicated that the first user and the second user were within a specified allowable distance from each other subsequent to an elapsed period of time during which the inferred locational proximity indicated that the first user and the second user were outside the specified allowable distance from each other.

In one embodiment, it can be determined that a signal strength of the second wireless communication had become substantially reduced. Time data indicating when the signal strength of the second wireless communication had become substantially reduced can be acquired. The duration can be determined based on the time data indicating when the second wireless communication was detected and on the time data indicating when the signal strength of the second wireless communication had become substantially reduced.

In one embodiment, each of the plurality of factors can be associated with a respective weight factor.

In one embodiment, the broadcasting of the first wireless communication can be performed over time.

In one embodiment, the broadcasting of the first wireless communication can be initiated based on a broadcast trigger.

In one embodiment, the broadcast trigger can occur when data from at least one of a gyroscope, an accelerometer, or a motion processor of the computing system indicates that the computing system is directed toward a source of the second wireless communication.

In one embodiment, the broadcast trigger can occur when locational data of the computing system based on at least one of Global Positioning System (GPS), WiFi, radio signal modulation, or geo-tagging indicates that the computing system is within a specified allowable distance from (i.e., sufficiently close to) a source of the second wireless communication.

In one embodiment, the broadcast trigger can occur when data from at least one of a gyroscope, an accelerometer, or a motion processor of the computing system indicates that the computing system is moving in a movement pattern similar to that of a source of the second wireless communication.

In one embodiment, the movement pattern can include at least one of a stationary pattern, a walking pattern, a running pattern, or a vehicle-riding pattern.

In one embodiment, a graphical element representing the second user can be presented on a display element of the computing system. The graphical element can be moved on the display element based on a locational proximity between the computing system and a source of the second wireless communication. The locational proximity can be determined using the signal strength data associated with the second wireless communication.

Many other features and embodiments of the invention will be apparent from the accompanying drawings and from the following detailed description.

Figure 1:
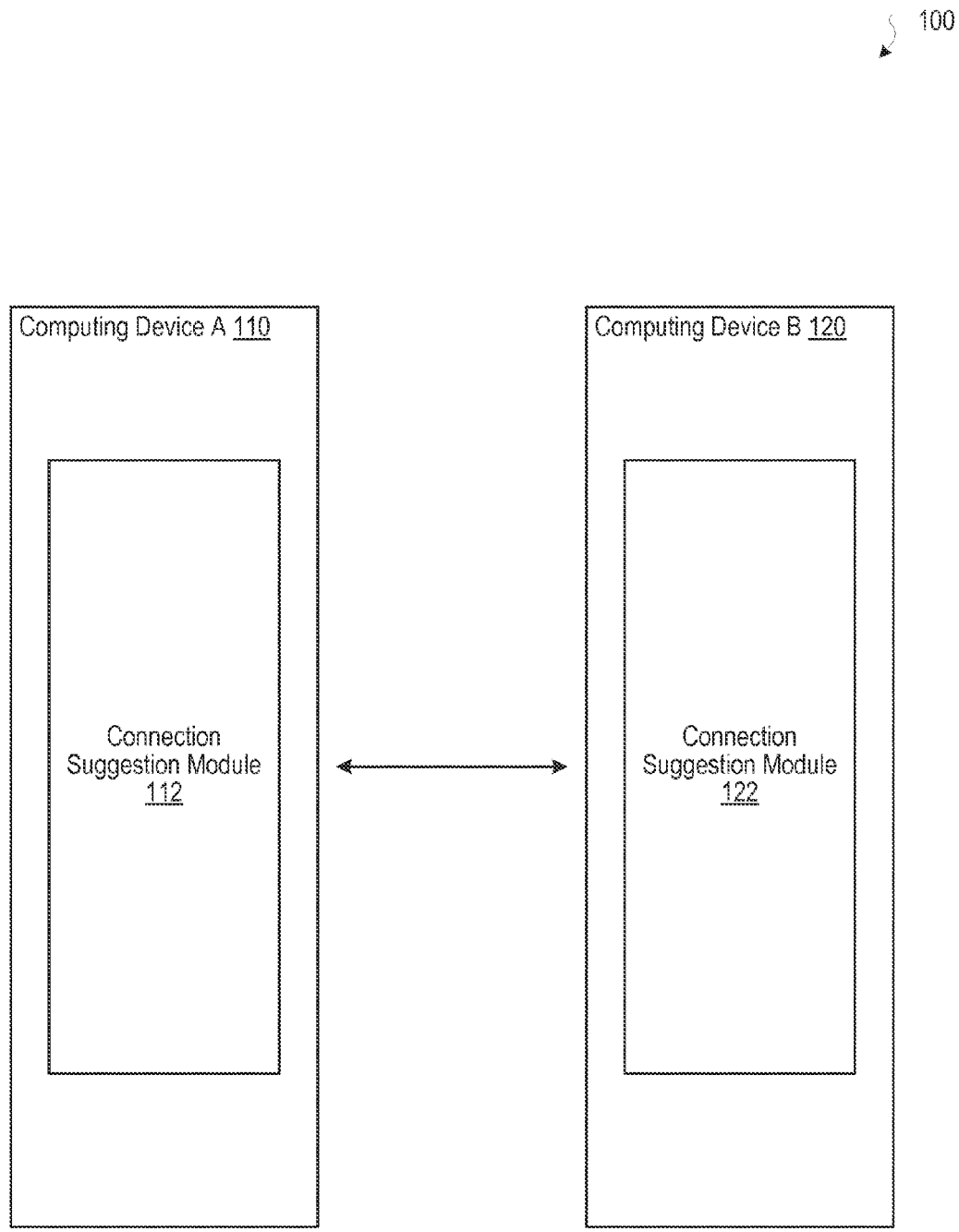
FIG. 1 illustrates an example system for utilizing wireless communications to suggest connections for a user, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Utilizing Wireless Communications to Suggest Connections for a User

People often utilize social networking services to establish social connections with one another. For example, a user of a social networking service can use a computing device to access the social networking service in order to connect with another user, such as by adding the other user as a "Friend" (or connection, contact, follower, subscriber, etc.). Upon establishing the connection, the user can communicate or otherwise interact with the other user via the social networking service.

Under conventional approaches, when a first user wants to find a second user within a social networking service, the first user usually has the second user's name, username, or contact information. In some instances, the first user can also find the second user through a mutual connection (e.g., a common "Friend" or connection, a common group membership, a shared "Like" or interest, etc.) or through another way of locating the second user.

However, in some cases, the first user may have met the second user but may not have a convenient or practical way of finding the second user. In one example, the first user and the second user meet at a gathering. The first user and the second user become acquainted and decide to connect with each other via a social networking service. In this example, during their meeting, the first user and the second user forgot to obtain each other's full names and contact information. Furthermore, the first user and second user do not have any mutual connections that are readily recognizable or apparent to each other. Thus, the opportunity for the first and second users to connect can be lost.

In another example, the first user and a third user take the bus together every day over a certain time period and become acquainted. In this example, the first user later decides to begin driving instead of taking the bus. The first user wishes to connect with the third user but the first user does not have the third user's contact information. The first user also does not have any other practical way of finding the third user within the social networking service. In this example, the first user and the third user are unable to find each other and reestablish communications. As such, it can be advantageous to provide an approach for users, who have met or have likely met, to connect with one another if they so choose.

Various embodiments of the present disclosure can utilize wireless communications to suggest connections for a user. For example, various embodiments can enable a first user's computing device, such as a smartphone, tablet computer, laptop computer, wearable device, etc., to transmit wireless signals to and receive wireless signals from a second user's computing device. Based on the wireless signals (and/or related information), it can be determined how close in proximity the first user's device and the second user's device were, how frequently the two devices came into close proximity, a duration of each time the two devices were in close proximity, and a pattern of occurrences of the two devices being in close proximity. Based on these and/or other factors, various embodiments of the present disclosure can make a determination, inference, deduction, and/or prediction of whether or not the first user and the second user have met. Continuing with the example, if it is determined that there is a sufficiently high likelihood that they have met (or that their meeting was sufficiently significant), then the first user can be provided with a suggested connection specifying the second user, and the second user can be provided with a suggested connection specifying the first user. The first user can then choose to add the second user as a connection, or vice versa. It is contemplated that many other uses, applications, and/or variations are possible.

FIG. 1 illustrates an example system 100 for utilizing wireless communications to suggest connections for a user, according to an embodiment of the present disclosure. The example system 100 includes a plurality of computing devices, such as a first computing device 110 and a second computing device 120. In some embodiments, each computing device can include a connection suggestion module. As shown in the example of FIG. 1, the first computing device 110 can include a first connection suggestion module 112 and the second computing device 120 can include a second connection suggestion module 122.

Each connection suggestion module can be configured to facilitate suggesting connections for its respective computing device. For example, the first connection suggestion module 112 can be configured to suggest connections for a first user of the first computing device 110, while the second connection suggestion module 122 can be configured to suggest connections for a second user of the second computing device 120.

In some embodiments, each connection suggestion module can be configured to utilize wireless communications to facilitate making connection suggestions. In some implementations, wireless communications can include short-range wireless communications, such as Bluetooth Low Energy (BLE) and/or another technology based on the Bluetooth 4.0 specification. In some instances, other wireless communications which can be utilized as well. These wireless communications technologies can include, but are not limited to, ZigBee, Z-Wave, radio-frequency identification (RFID), near-field communication (NFC), and/or personal area network (PAN) communication.

In one example, Bluetooth Low Energy (BLE) can be utilized by each of the computing devices 110 and 120 to facilitate making connection suggestions. In this example, the first computing device 110 can broadcast (or transmit) at least a first BLE signal, which can be detectable by nearby devices. Similarly, the second computing device 120 can also broadcast (or transmit) at least a second BLE signal, which can be detectable by nearby devices. Accordingly, the first and second computing devices 110 and 120 can, in some cases, function as BLE beacons that broadcast and receive BLE signals.

When the first and second computing devices 110 and 120 are sufficiently close to one another (e.g., within the range of BLE technology), their respective BLE broadcasts can be detected (or received, "heard," etc.) by each other. For example, in some cases, the effective range of BLE can be several meters, such that if the first and second computing devices 110 and 120 are within several meters from one another, they can listen for and detect each other's respective broadcast(s). Upon detecting each other's respective broadcast(s), the computing devices 110 and 120 can recognize that they are near or close in proximity to one another. Furthermore, in some embodiments, the signal strength of each BLE broadcast can be used to indicate how far away a source of the BLE is (e.g., how far away is the computing device that broadcasted the BLE signal). For example, a stronger signal strength of a received BLE signal can indicate that the broadcasting computing device is closer, whereas a weaker signal strength can indicate that the broadcasting computing device is further.

An advantage of BLE can be that BLE does not consume a significant amount of energy or power relative to other wireless communication technologies. Battery life for the computing devices 110 and 120 can be limited. Utilizing BLE technology can help an effort to maintain device battery life as long as possible between charges. Another advantage of BLE can be accuracy. Relative to other technologies such as Global Positioning System (GPS), WiFi, cellular triangulation, etc., BLE can more accurately determine the relative locations of computing devices that are close in proximity to one another. Accordingly, in at least some embodiments, BLE (and/or other suitable short-range wireless communications) can be utilized to facilitate suggesting connections for a user, such as suggesting "Friends" for the user to add within a social networking service.

Figure 2:
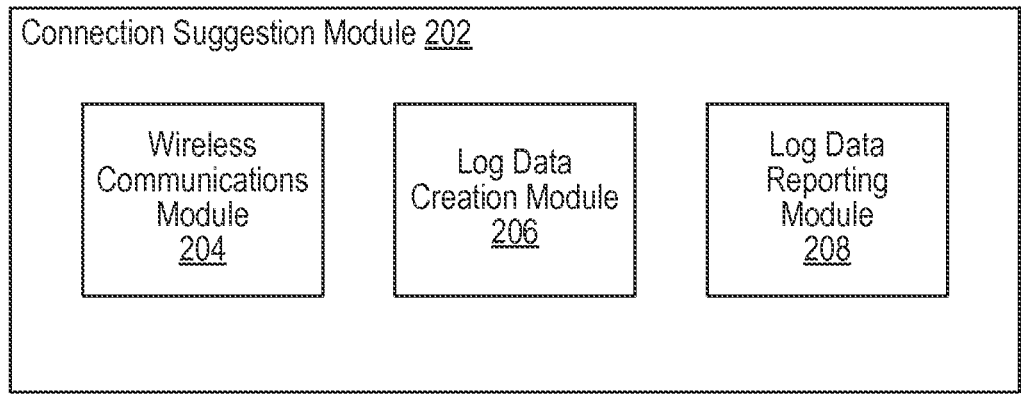
FIG. 2 illustrates an example connection suggestion module configured to facilitate utilizing wireless communications to suggest connections for a user, according to an embodiment of the present disclosure.

FIG. 2 illustrates an example connection suggestion module 202 configured to facilitate utilizing wireless communications to suggest connections for a user, according to an embodiment of the present disclosure. In some instances, the example connection suggestion module 202 can correspond to each of the connection suggestion modules 110 and 120 in FIG. 1. In some embodiments, the connection suggestion module 202 can be implemented as hardware, software, or any combination thereof. For example, the connection suggestion module 202 can be implemented as a component associated with a social networking service application (i.e., social networking app, social media app, messaging app, etc.) running on a computing device. In another example, the connection suggestion module 202 can be implemented within an operating system of the computing device. In FIG. 2, the connection suggestion module 202 can include a wireless communications module 204, a log data creation module 206, and a log data reporting module 208.

The wireless communications module 204 can be configured to broadcast (or transmit, ping, etc.) wireless signals as well as to detect (or receive, hear, etc.) wireless signals from other broadcasting sources. In some embodiments, the wireless communications module 204 can utilize BLE technology, such that the module 204 can broadcast and detect BLE signals or communications.

In some embodiments, the wireless communications module 204 can be configured to broadcast at least a first wireless communication, such as a first BLE signal. The first wireless communication can include information associated with a first user. In one example, the first user can correspond to a user of a computing device which implements the connection suggestion module 202. The first user can also, for example, correspond to a user of a social networking service. In some cases, an application for the social networking service can be implemented and/or running on the computing device. Continuing with this example, the information associated with the first user can include an identifier for the first user within the social networking service, such as a username, a profile name, a user identification, or a web address (e.g., URL, link, etc.) to the first user's profile within the social networking service. Furthermore, in some cases, the information associated with the first user can include information inputted by the first user, such as a web address which links to a web resource (e.g., a web site, online media content, etc.).

Moreover, in some implementations, the wireless communications module 204 can be configured to detect at least a second wireless communication (e.g., a second BLE signal) which can be broadcasted from another source, such as a second computing device. The second wireless communication can include information associated with a second user. In one example, the second user can correspond to a user of the second computing device as well as another user of the social networking service. The information associated with the second user can include an identifier for the second user. The wireless communications module 204 can be configured to analyze (e.g., read, parse, decipher, etc.) the information associated with the second user. In this example, based on the analysis, the identifier for the second user can be recognized.

The log data creation module 206 can be configured to create (e.g., generate, form, write, etc.) log data. In some embodiments, the log data can include at least a portion of the information associated with the second user, such as the identifier for the second user. Moreover, signal strength data associated with the second wireless communication can also be acquired. The signal strength data can indicate how strong or weak the second wireless communication was when detected. Based on the signal strength data, it can be inferred how far away the broadcasting source of the second wireless communication was, as discussed previously. The log data creation module 206 can include the signal strength data in the log data. Furthermore, time data indicating when the second wireless communication was detected can also be acquired. The log data creation module 206 can also include the time data in the log data.

In one example, numerous instances of wireless communications can be broadcasted and detected by the computing device of the first user during a period of time (e.g., a minute, an hour, a day, a week, etc.). In some implementations, the log data creation module 206 of the computing device can generate many instances of log data, each of which records information associated with a respective wireless communication (e.g., BLE signal) that had been detected. At a specified time, such as at the end of the day, the log data reporting module 208 can provide the log data, including all relevant instances of the log data, for analysis and further processing. The log data reporting module 208 can, for example, consolidate and/or compress the log data, including all relevant instances, and transmit the log data to at least one server for further processing and analysis.

The at least one server can suggest one or more connections for the first user based on the processing and/or analysis of the log data. In some cases, the log data can be analyzed to make an inference, determination, and/or prediction of how likely the first user has met one or more other users (e.g., the second user) identified via the detected wireless communications. In some implementations, only those users with a sufficiently high likelihood of having met with the first user can be suggested as connections for the first user. The connection suggestion module 202 can then receive the one or more suggested connections and present them to the first user. The first user can choose, e.g., via an instruction or command, to connect with the one or more suggested connections.

Figure 3:
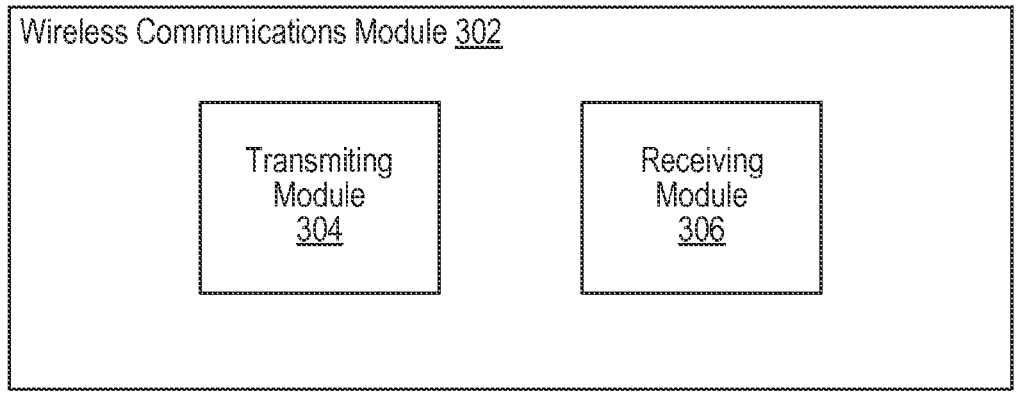
FIG. 3 illustrates an example wireless communications module configured to facilitate utilizing wireless communications to suggest connections for a user, according to an embodiment of the present disclosure.

FIG. 3 illustrates an example wireless communications module 302 configured to facilitate utilizing wireless communications to suggest connections for a user, according to an embodiment of the present disclosure. In some cases, the example wireless communications module 302 can correspond to the wireless communications module 202 in FIG. 2. In some embodiments, the wireless communications module 302 can be implemented as hardware, software, or any combination thereof. For example, if the wireless communications module 302 is configured to utilize BLE technology, then the wireless communications module 302 can be associated with one or more BLE chips, BLE controllers, BLE antennas, BLE protocols, and/or other related components. As shown in FIG. 3, the wireless communications module 302 can include a transmitting (or broadcasting) module 304 and a receiving (or detecting) module 306.

In some implementations, a wireless communication (e.g., a BLE signal, broadcast, and/or transmission, etc.) can be associated with a unique identifier (UID). In some implementations, the wireless communication can also be associated with a major value and a minor value. Moreover, as discussed above, each wireless communication broadcasted by the wireless communications module (e.g., module 302) can include information associated with a first user. The wireless communications module 302 can be configured to utilize the UID, the major value, the minor value, and/or any combination thereof, to represent the information associated with the first user. For example, a combination of the UID, the major value, the minor value, and/or any portion(s) thereof can be translated, converted, and/or formatted to represent a web address, a string, text, and/or other content items associated with the first user. Similarly, as discussed above, a wireless communication detected by the wireless communications module (e.g., module 302) can include information associated with a user of a broadcasting source. The wireless communications module 302 can analyze (e.g., access, read, parse, decipher, etc.) the detected wireless communication's UID, major value, minor value, and/or any combination thereof, to recognize the information associated with the user of the broadcasting source.

In some embodiments, the transmitting module 304 can be configured to transmit or broadcast a wireless communication. The transmitting module 304 can also prepare (e.g., translate, convert, format, etc.) the wireless communications to represent particular information. In some embodiments, the receiving module 306 can be configured to receive or detect a wireless communication. The receiving module 306 can also analyze (e.g., access, read, parse, decipher, etc.) the detected wireless communication to recognize information represented in the detected wireless communication. It is also contemplated that, in some instances, the transmitting module 304 and the receiving module 306 can be implemented as a single module. For example, in some cases, the transmitting module 304 and the receiving module 306 can reside together, work in conjunction with one another, and/or operate as a unit.

Figure 4:
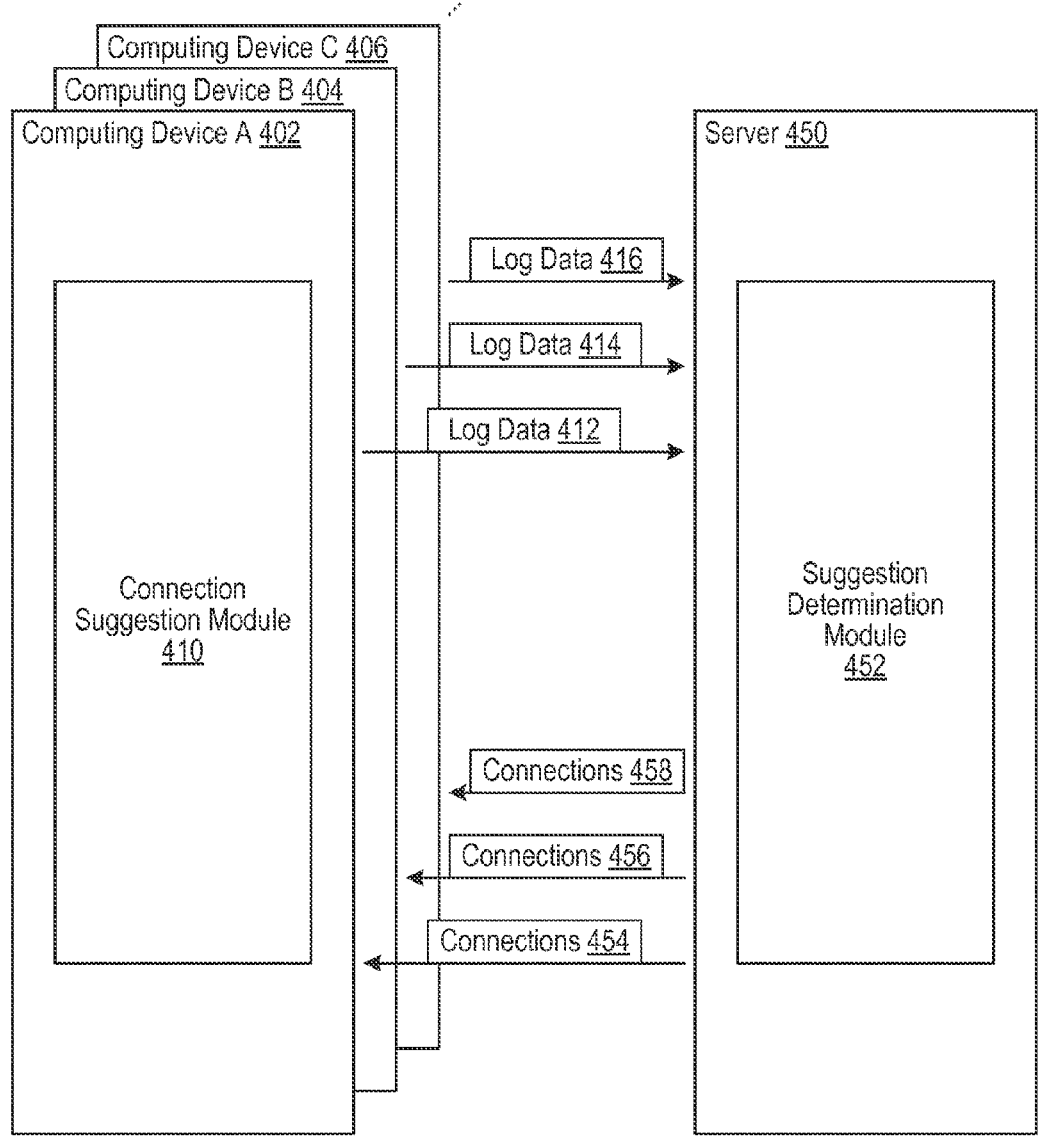
FIG. 4 illustrates an example system for utilizing wireless communications to suggest connections for a user, according to an embodiment of the present disclosure.

FIG. 4 illustrates an example system 400 for utilizing wireless communications to suggest connections for a user, according to an embodiment of the present disclosure. The example system 400 can include a plurality of computing devices, such as a first computing device 402, a second computing device 404, and a third computing device 406. The example system 400 can also include at least one server 450.

For illustration purposes, FIG. 4 only illustrates a connection suggestion module 410 for the first computing device 402. The connection suggestion module 410 can correspond to the connection suggestion module 202 of FIG. 2. It is understood that each of the second computing device 404 and the third computing device 406 includes a respective connection suggestion module as well.

In the example of FIG. 4, each computing device can transmit and detect wireless communications, generate log data based on detected wireless communications, and provide the log data to the at least one server. In this example, the first computing device 402 can provide first log data 412 to the at least one server 450, the second computing device 404 can provide second log data 414, and the third computing device 406 can provide third log data 416.

The at least one server 450 can receive the first log data 412, the second log data 414, and the third log data 416. As shown in the example, the at least one server 450 can include a suggestion determination module 452. The suggestion determination module 452 can be configured to generate or determine suggested connections for users based on received log data. In this example, the suggestion determination module 452 can suggest connections 454 for a first user associated with the first device 402, connections 456 for a second user associated with the second device 404, and connections 458 for a third user associated with the third device 406.

Figure 5:
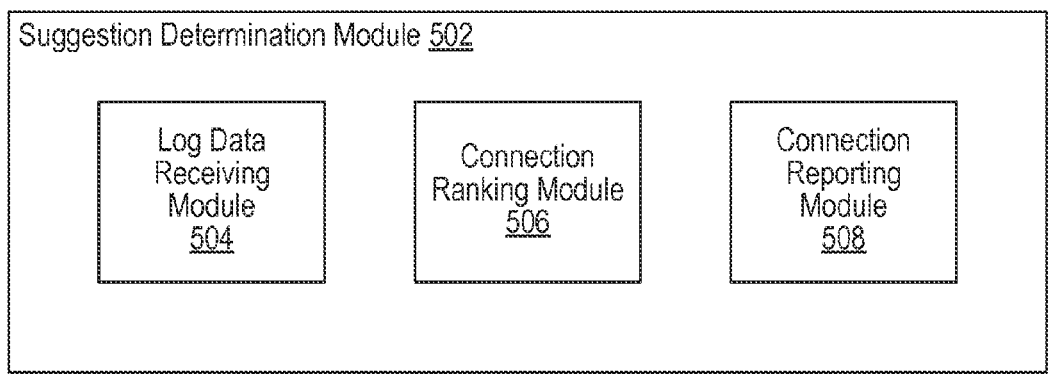
FIG. 5 illustrates an example suggestion determination module configured to facilitate utilizing wireless communications to suggest connections for a user, according to an embodiment of the present disclosure.

FIG. 5 illustrates an example suggestion determination module 502 configured to facilitate utilizing wireless communications to suggest connections for a user, according to an embodiment of the present disclosure. The suggestion determination module 502 can, for example, correspond to the suggestion determination module 452 of FIG. 4. The suggestion determination module 502 can include a log data receiving module 504, a connection ranking module 506, and a connection reporting module 508.

The log data receiving module 504 can be configured to receive log data, such as log data provided by a plurality of computing devices that have detected wireless communications. In some cases, the log data receiving module 504 can prepare (e.g., format, modify, etc.) the log data for further processing and/or analysis.

The connection ranking module 506 can be configured to rank connections which can be potentially suggested for a respective user (i.e., a user associated with a respective computing device or system that provided log data). In some embodiments, potentially suggestible connections can be ranked, based on a plurality of factors, to determine whether the connections should be suggested for the respective user.

In one example, log data can be received from a computing system associated with a first user. The log data can indicate that a second wireless communication was detected by the computing system. The log data can also indicate that the second wireless communication includes information associated with a second user. In this example, the connection ranking module 506 can rank the second user. In some cases, the ranking can be based on a plurality of factors derived from the log data. The plurality of factors can include, for example, an inferred locational proximity between the first and second users, a frequency of inferred meetings between the first and second users, durations of inferred meetings between the two users, a pattern associated with when inferred meetings tended to occur, and/or other factors. If it is determined that there is a sufficiently high likelihood that the first user has met the second user (and/or that their meeting(s) was sufficiently meaningful or significant), then the connection ranking module 506 can give a high rank to the second user. In some embodiments, the likelihood that the first user has met the second user can be qualitatively or quantitatively assessed or determined. A sufficiently high likelihood of the meeting may be based on satisfaction of a specified, qualitative or quantitative threshold or level associated with such likelihood. Likewise, in some embodiments, the meaning or significance of a meeting can be qualitatively or quantitatively assessed or determined. Sufficiency in the meaning or significance of the meeting may be based on satisfaction of a specified, qualitative or quantitative threshold or level associated with such sufficiency. It is understood that a similar approach can be taken for log data indicating that a third wireless communication was detected by the computing system and indicating that the third wireless communication includes information associated with a third user, and so forth.

In some cases, the inferred locational proximity factor can be determined based on signal strength data associated with the second wireless communication. In some cases, the frequency factor can be determined based on a number of instances in which the inferred locational proximity indicated sufficient nearness (e.g., sufficient closeness in proximity) between the first user and the second user subsequent to an elapsed period of time during which the inferred locational proximity indicated insufficient nearness between the first user and the second user. In some embodiments, sufficient nearness (or insufficient nearness) can be qualitatively or quantitatively assessed or determined. Sufficient nearness (or insufficient nearness) may be based on satisfaction (or non-satisfaction) of a specified, qualitative or quantitative threshold or level associated with such sufficiency (or insufficiency). In some implementations, sufficient nearness can be based on determining that the first user and the second user are within a specified allowable distance from each other, whereas insufficient nearness can be based on determining that the first user and the second user are outside the specified allowable distance from each other.

Moreover, in some instances, it can be determined that a signal strength of the second wireless communication had become substantially reduced. Time data indicating when the signal strength of the second wireless communication had become substantially reduced can be acquired. The duration factor discussed above can be determined based on the time data indicating when the second wireless communication was detected and based on the time data indicating when the signal strength of the second wireless communication had become substantially reduced.

In some implementations, the pattern factor can be determined based on the frequency factor, the duration factor, and/or times and dates of when the inferred meetings occurred. Many variations are possible.

Furthermore, in some implementations, each of the plurality of factors can be associated with a respective weight factor. As such, the ranking of potentially suggestible connections can be based on the weighted factors. In one example, the frequency factor can be assigned a 50% weight, the duration or length factor can be assigned a 30% weight, and the pattern factor can be assigned a 20% weight.

The connection reporting module 508 can be configured to report or provide one or more suggested connections. Continuing with the previous example, if the second user is sufficiently highly ranked (e.g., satisfies specified ranking criteria and/or a ranking threshold value), then the second user can be suggested as a connection for the first user. The connection reporting module 508 can transmit the suggested connections for the first user to the computing system that provided the log data. The computing system can then present the suggestion connections to the first user.

Figure 6A:
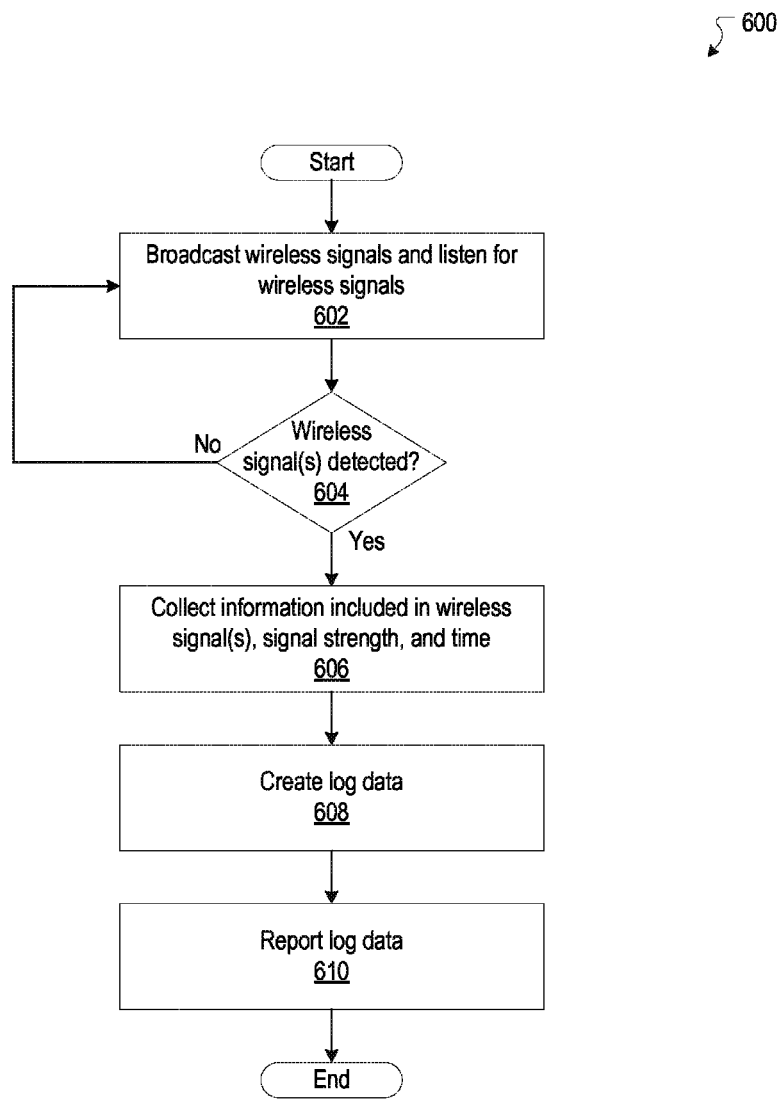
FIG. 6A illustrates an example method associated with utilizing wireless communications to suggest connections for a user, according to an embodiment of the present disclosure.

FIG. 6A illustrates an example method 600 associated with utilizing wireless communications to suggest connections for a user, according to an embodiment of the present disclosure. It should be appreciated that there can be additional, fewer, or alternative steps performed in similar or alternative orders, or in parallel, within the scope of the various embodiments unless otherwise stated. In some embodiments, the example method 600 can be associated with a computing device that facilitates utilizing wireless communications to suggest connections.

At block 602, the example method 600 can broadcast wireless signals and listen for wireless signals. The broadcasted wireless signals can include information associated with a first user.

At block 604, the example method 600 can determine whether or not a wireless signal(s) has been detected. If not, the method 600 goes back to block 602. If so, the method 600 continues to block 606.

At block 606, the example method 600 can collect information included in the wireless signal(s), signal strength, and time. The information can be associated with a second user. The signal strength can be associated with the detected wireless signal(s). The time can indicate when the signal(s) was detected.

At block 608, the example method 600 can create log data. The log data can include at least a portion of the information, the signal strength, and the time.

At block 610, the example method 600 can report the log data. For example, the log data can be provided or transmitted to at least one server for further processing and/or analysis.

Figure 6B:
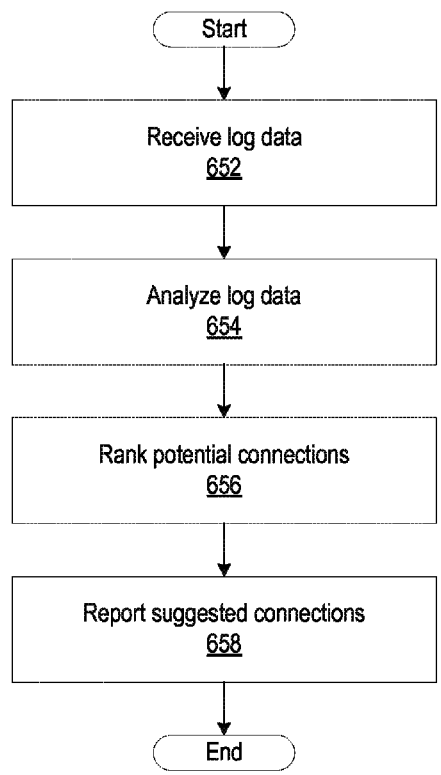
FIG. 6B illustrates an example method associated with utilizing wireless communications to suggest connections for a user, according to an embodiment of the present disclosure.

FIG. 6B illustrates an example method 650 associated with utilizing wireless communications to suggest connections for a user, according to an embodiment of the present disclosure. Again, it should be appreciated that there can be additional, fewer, or alternative steps performed in similar or alternative orders, or in parallel, within the scope of the various embodiments unless otherwise stated. In some embodiments, the example method 650 can be associated with at least one server that facilitates utilizing wireless communications to suggest connections.

At block 652, the example method 650 can receive log data. As discussed, the log data can include at least a portion of information associated with a detected wireless signal, a signal strength of the detected wireless signal, and the time at which the wireless signal was detected.

At block 654, the example method 650 can analyze the log data. In some embodiments, the log data can be analyzed to determine how close in proximity were the first user (or the first user's device) and the second user (or the second user's device). The log data can also be analyzed to determine how frequently the first user came into close proximity with the second user. The log data can further be analyzed to determine the duration of each time the first and second users came into close proximity. The log data can also be analyzed to determine a pattern or trend of occurrences of the two users being in close proximity.

At block 656, the example method 650 can rank potential connections. For example, the method 650 can rank the second user based on the above factors, such as proximity, frequency, duration, pattern, and/or based on other factors. If it is determined that there is a sufficiently high likelihood that the first user has met the second user (and/or that the meeting was sufficiently meaningful or significant), then the method 650 can give a high rank to the second user.

At block 658, the example method 650 can report or provide the suggested connections. For example, if the second user is sufficiently highly ranked, then the second user can be suggested as a connection for the first user (and vice versa).

Figure 7:
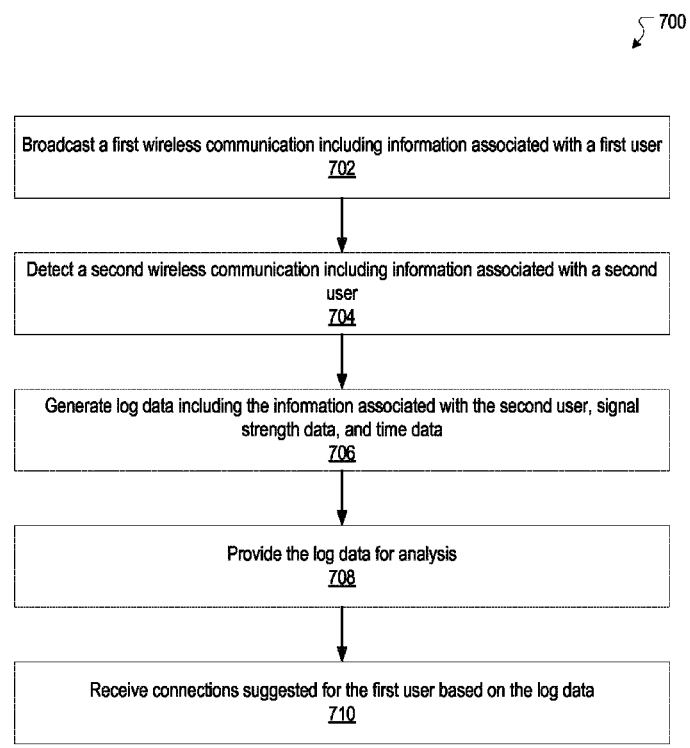
FIG. 7 illustrates an example method associated with utilizing wireless communications to suggest connections for a user, according to an embodiment of the present disclosure.

FIG. 7 illustrates an example method 700 associated with utilizing wireless communications to suggest connections for a user, according to an embodiment of the present disclosure. As discussed above, it should be appreciated that there can be additional, fewer, or alternative steps performed in similar or alternative orders, or in parallel, within the scope of the various embodiments unless otherwise stated.

At block 702, the example method 700 can broadcast a first wireless communication including information associated with a first user. The first wireless communication can, for example, correspond to a first BLE signal including a social network identifier for the first user.

In some embodiments, the broadcasting of the first wireless communication can be performed over time. For example, a computing device can broadcast the first wireless communication continuously, a few times every second, once every few seconds, once per minute, twice per day, etc.

At block 704, the example method 700 can detect a second wireless communication including information associated with a second user. The second wireless communication can, for example, correspond to a second BLE signal including a social network identifier for the second user.

In some implementations, the broadcasting of the first wireless communication can be initiated based on a broadcast trigger. For example, the broadcast trigger can occur when data from at least one of a gyroscope, an accelerometer, or a motion processor of the computing system indicates that the computing system is directed toward a source of a second wireless communication. In another example, the broadcast trigger can occur when locational data of the computing system based on at least one of Global Positioning System (GPS), WiFi, radio signal modulation, or geo-tagging indicates that the computing system is sufficiently close to a source of the second wireless communication. The locational data can indicate whether or not the first and second users are likely in the same area based on absolute location.

In some implementations, the broadcast trigger can occur when data from at least one of a gyroscope, an accelerometer, or a motion processor of the computing system indicates that the computing system is moving in a movement pattern similar to that of the source of the second wireless communication. For example, the movement pattern can include at least one of a stationary pattern, a walking pattern, a running pattern, or a vehicle-riding pattern.

At block 706, the example method 700 can generate log data including at least a portion of the information associated with the second user, signal strength data associated with the second wireless communication, and time data indicating when the second wireless communication was detected. In some cases, the log data can be useful for determining, calculating, and/or inferring distances between the first and second users (or their devices), a frequency of meetings or interactions between the first and second users, a duration for each meeting or interaction between the first and second users, and a pattern of occurrences of meetings or interactions between the first and second users.

At block 708, the example method 700 can provide the log data for analysis. For example, the log data can be provided, reported, or transmitted to at least one server for further processing and/or analysis.

At block 710, the example method 700 can receive one or more connections suggested for the first user based, at least in part, on the log data. For example the at least one server can analyze the log data to determine factors as discussed above (e.g., distance, frequency, duration, pattern). The one or more connections can be suggested based on the above factors.

Figure 8:
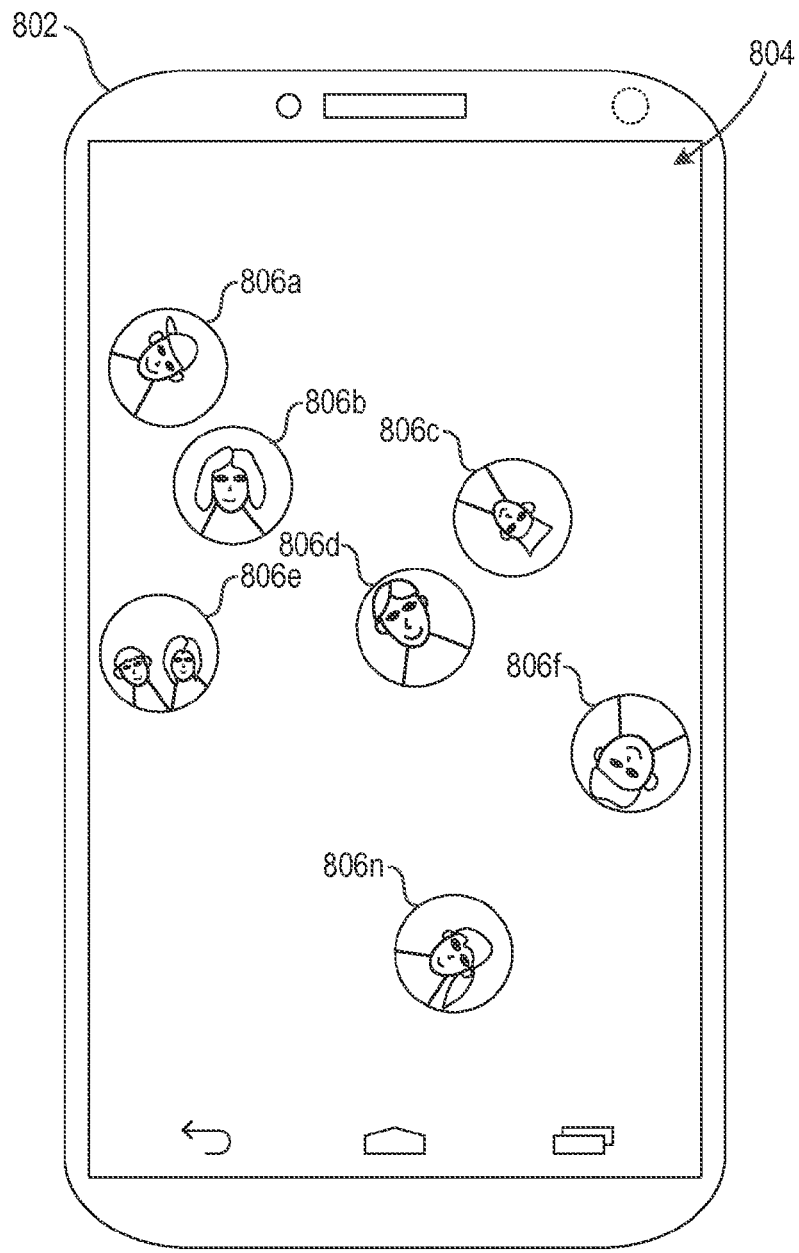
FIG. 8 illustrates an example computing device including an example interface associated with utilizing wireless communications to suggest connections for a user, according to an embodiment of the present disclosure.

FIG. 8 illustrates an example computing device 802 including an example interface 804 associated with utilizing wireless communications to suggest connections for a user, according to an embodiment of the present disclosure. In some embodiments, a graphical element representing the second user can be presented on a display element of a computing system that detects the second wireless communication. The graphical element can be moved on the display element based on a locational proximity between the computing system and a source of the second wireless communication. The locational proximity can be determined using the signal strength data associated with the second wireless communication. In some implementations, the signal strength data associated with the second wireless communication can be detected or acquired in real-time, such that the moving of the graphical element can also occur in real-time. In one example, the graphical element can include a circular icon or a bubble (e.g., element 806a) that presents a profile picture of the second user. The profile picture can be acquired based on the information associated with the second user. In some instances, multiple graphical elements (e.g., elements 806a-

806n) can be presented and moved (e.g., in real-time) for multiple users associated with multiple detected wireless communications.

In some embodiments, a user can choose to opt-in to use various features described herein. In some embodiments, various features can be disabled based on privacy concerns.

It is further contemplated that there can be many other uses, applications, and/or variations associated with the various embodiments of the present disclosure.

Social Networking System—Example Implementation

Figure 9:
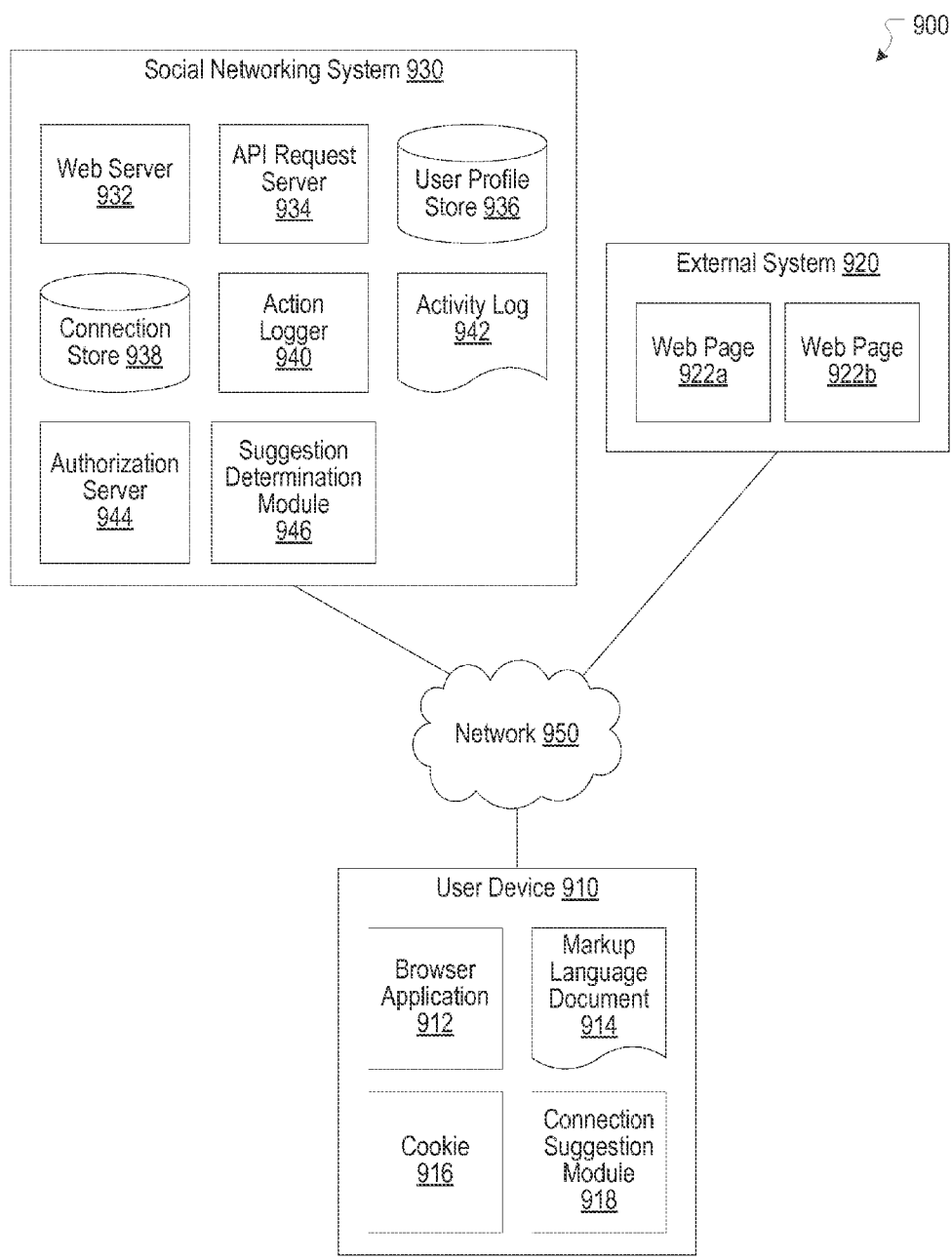
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a suggestion determination module 946. The suggestion determination module 946 can, for example, be implemented as the suggestion determination module 502 of FIG. 5. Moreover, in some embodiments, the user device 910 can include a connection suggestion module 918. The connection suggestion module 918 can, for example, be implemented as the connection suggestion module 202 of FIG. 2. In some implementations, the connection suggestion module 918 and the suggestion determination module 946 can work in conjunction to utilize wireless communications to suggest connections to a user.

Hardware Implementation

Figure 10:
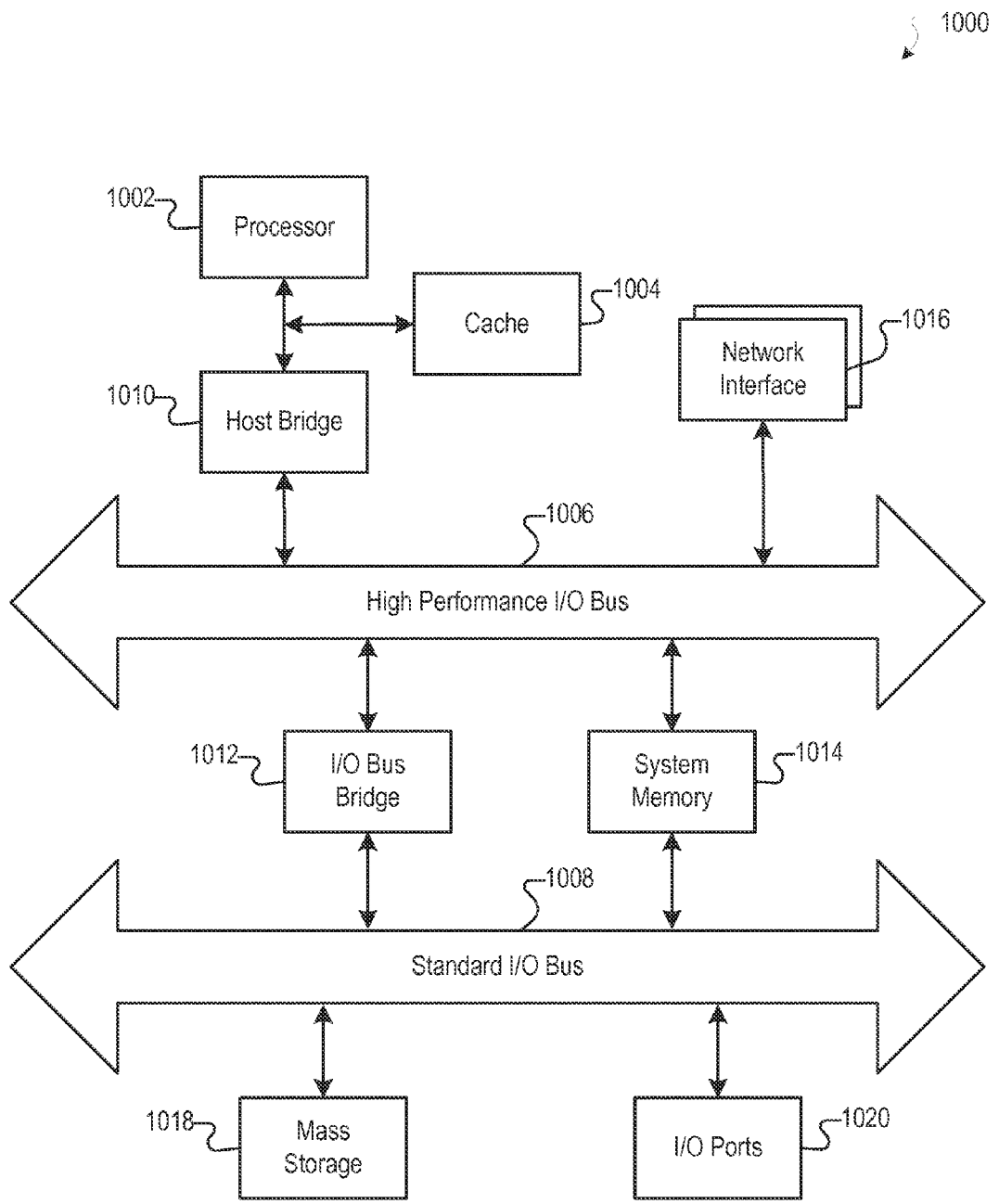
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   broadcasting, by a computing system, a first wireless communication including information associated with a first user;
   detecting, by the computing system, a second wireless communication including information associated with a second user;

generating, by the computing system, log data including at least a portion of the information associated with the second user, signal strength data associated with the second wireless communication, and time data indicating when the second wireless communication was detected;

providing, by the computing system, the log data for analysis; and receiving, by the computing system, one or more connections suggested for the first user based, at least in part, on the log data, wherein the log data is analyzed to determine whether the second user is to be included as a connection in the one or more connections suggested for the first user, wherein the second user is ranked, based on a plurality of factors, to determine whether the second user is to be included in the one or more connections suggested for the first user, the plurality of factors including at least one of an inferred locational proximity between the first user and the second user, a frequency of inferred meetings between the first user and the second user, a duration of each of the inferred meetings between the first user and the second user, or a pattern of occurrences of inferred meetings between the first user and the second user.

2. The computer-implemented method of claim 1, further comprising:
presenting the one or more connections suggested for the first user; and
receiving an instruction from the first user to connect with at least some of the one or more connections.

3. The computer-implemented method of claim 1, wherein each of the first wireless communication and the second wireless communication corresponds to at least one of a Bluetooth Low Energy (BLE) communication, a ZigBee communication, a Z-Wave communication, a radio-frequency identification (RFID) communication, a near-field communication (NFC), or a personal area network (PAN) communication.

4. The computer-implemented method of claim 1, wherein the information associated with the first user includes a first identifier of the first user within a social networking service, and wherein the information associated with the second user includes a second identifier of the second user within the social networking service.

5. The computer-implemented method of claim 1, wherein the information associated with the first user includes a first web address, and wherein the information associated with the second user includes a second web address.

6. The computer-implemented method of claim 1, wherein the inferred locational proximity is determined based on the signal strength data associated with the second wireless communication.

7. The computer-implemented method of claim 1, wherein the frequency is determined based on a number of instances in which the inferred locational proximity indicated that the first user and the second user were within a specified allowable distance from each other subsequent to an elapsed period of time during which the inferred locational proximity indicated that the first user and the second user were outside the specified allowable distance from each other.

8. The computer-implemented method of claim 1, further comprising:
determining that a signal strength of the second wireless communication had become substantially reduced; and
acquiring time data indicating when the signal strength of the second wireless communication had become substantially reduced, wherein the duration is determined based on the time data indicating when the second wireless communication was detected and on the time data indicating when the signal strength of the second wireless communication had become substantially reduced.

9. The computer-implemented method of claim 1, wherein each of the plurality of factors is associated with a respective weight factor.

10. The computer-implemented method of claim 1, wherein the broadcasting of the first wireless communication is performed over time.

11. The computer-implemented method of claim 1, wherein the broadcasting of the first wireless communication is initiated based on a broadcast trigger.

12. The computer-implemented method of claim 11, wherein the broadcast trigger occurs when data from at least one of a gyroscope, an accelerometer, or a motion processor of the computing system indicates that the computing system is directed toward a source of the second wireless communication.

13. The computer-implemented method of claim 11, wherein the broadcast trigger occurs when locational data of the computing system based on at least one of Global Positioning System (GPS), WiFi, radio signal modulation, or geo-tagging indicates that the computing system is within a specified allowable distance from a source of the second wireless communication.

14. The computer-implemented method of claim 11, wherein the broadcast trigger occurs when data from at least one of a gyroscope, an accelerometer, or a motion processor of the computing system indicates that the computing system is moving in a movement pattern similar to that of a source of the second wireless communication.

15. The computer-implemented method of claim 14, wherein the movement pattern includes at least one of a stationary pattern, a walking pattern, a running pattern, or a vehicle-riding pattern.

16. The computer-implemented method of claim 1, further comprising:
presenting, on a display element of the computing system, a graphical element representing the second user; and
moving the graphical element on the display element based on a locational proximity between the computing system and a source of the second wireless communication, the locational proximity being determined using the signal strength data associated with the second wireless communication.

17. A system comprising:
at least one processor; and
a memory storing instructions that, when executed by the at least one processor, cause the system to perform:
broadcasting a first wireless communication including information associated with a first user;
detecting a second wireless communication including information associated with a second user;
generating log data including at least a portion of the information associated with the second user, signal strength data associated with the second wireless communication, and time data indicating when the second wireless communication was detected;
providing the log data for analysis; and
receiving one or more connections suggested for the first user based, at least in part, on the log data, wherein the log data is analyzed to determine whether the second user is to be included as a connection in the one or more connections suggested for the first user, wherein the second user is ranked, based on a plurality of factors, to determine whether the second user is to be included in the one or more connections suggested for the first user, the plurality of factors including at least one of an inferred locational proximity between the first user and the second user, a frequency of inferred meetings between the first user and the second user, a duration of each of the inferred meetings between the first user and the second user, or a pattern of occurrences of inferred meetings between the first user and the second user.

18. A non-transitory computer-readable storage medium including instructions that, when executed by at least one processor of a computing system, cause the computing system to perform:

broadcasting a first wireless communication including information associated with a first user;

detecting a second wireless communication including information associated with a second user;

generating log data including at least a portion of the information associated with the second user, signal strength data associated with the second wireless communication, and time data indicating when the second wireless communication was detected;

providing the log data for analysis; and receiving one or more connections suggested for the first user based, at least in part, on the log data, wherein the log data is analyzed to determine whether the second user is to be included as a connection in the one or more connections suggested for the first user, wherein the second user is ranked, based on a plurality of factors, to determine whether the second user is to be included in the one or more connections suggested for the first user, the plurality of factors including at least one of an inferred locational proximity between the first user and the second user, a frequency of inferred meetings between the first user and the second user, a duration of each of the inferred meetings between the first user and the second user, or a pattern of occurrences of inferred meetings between the first user and the second user.

* * * * *